July 11, 1933.  J. L. RENNELS  1,918,133
SEED COTTON UNLOADING APPARATUS
Filed Sept. 26, 1932  2 Sheets-Sheet 2
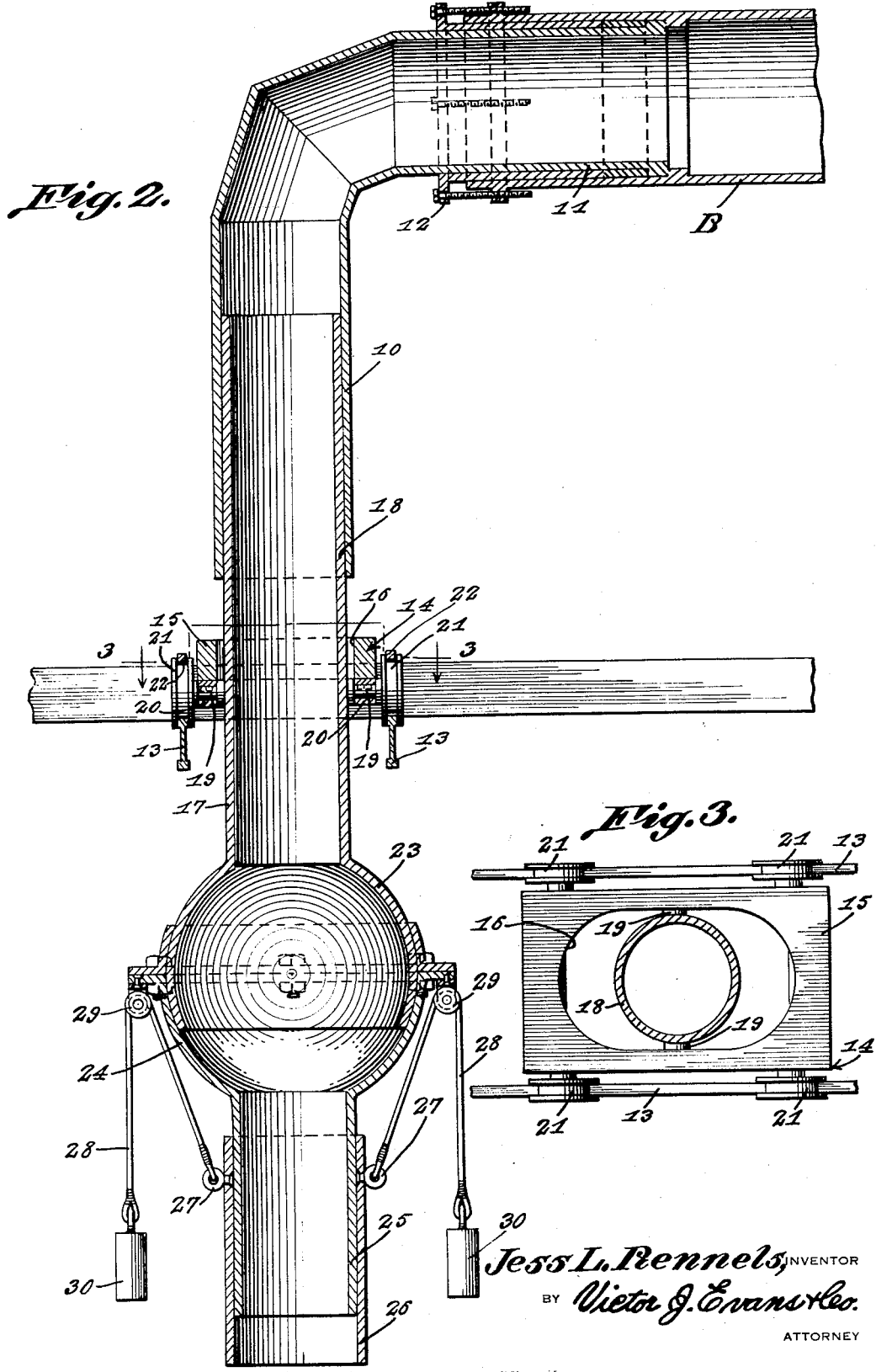
Jess L. Rennels, INVENTOR
BY Victor J. Evans & Co.
ATTORNEY Patented July 11, 1933

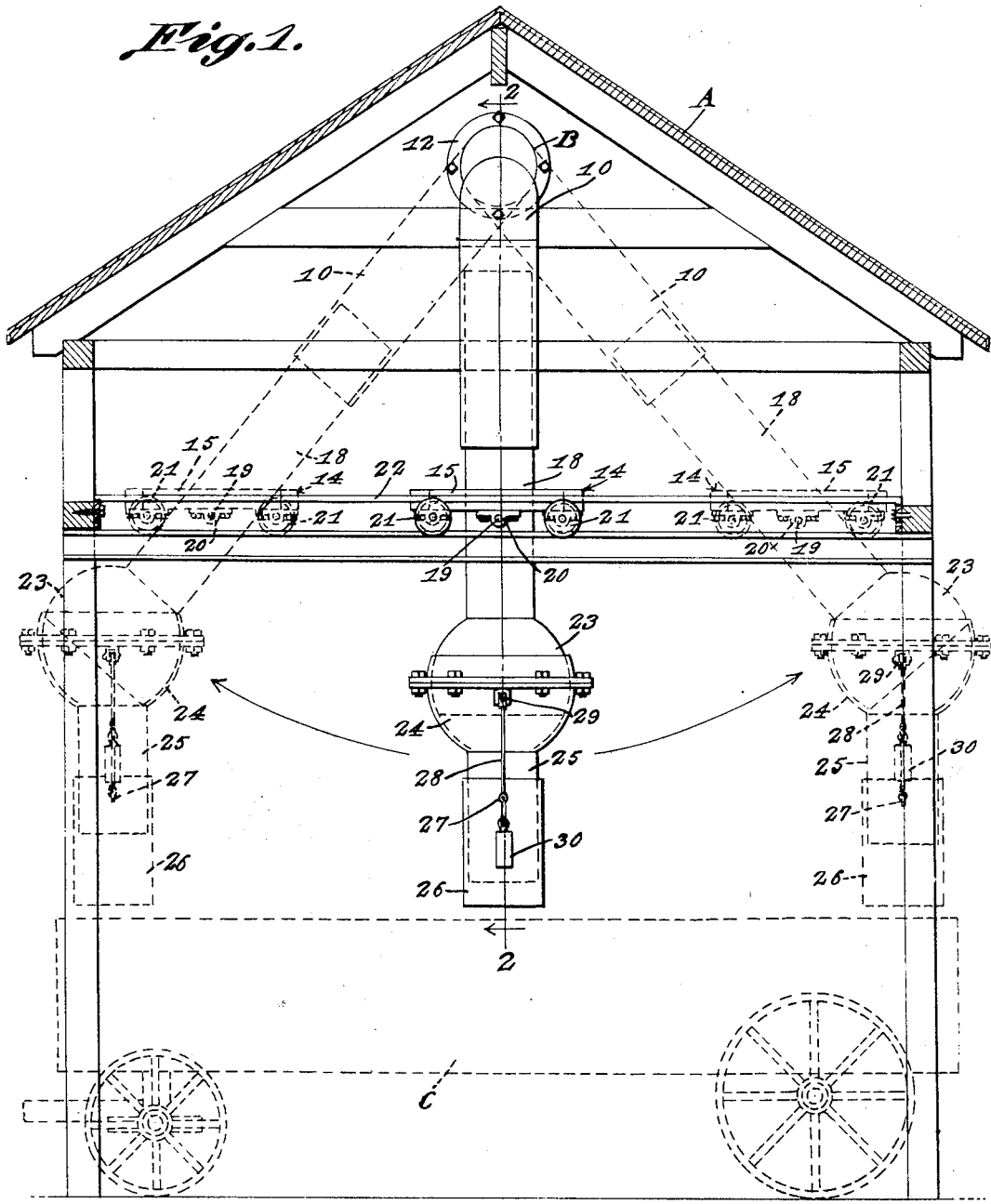

1,918,133

UNITED STATES PATENT OFFICE

JESS L. RENNELS, OF CROWELL, TEXAS, ASSIGNOR OF ONE-FOURTH TO JAMES A. PRESLEY AND ONE-FOURTH TO DELLA M. PRESLEY, BOTH OF VERNON, TEXAS, AND ONE-FOURTH TO FRED RENNELS, OF CROWELL, TEXAS

SEED COTTON UNLOADING APPARATUS

Application filed September 26, 1932. Serial No. 634,969.

The invention relates to a cotton handling machine and more especially to a seed cotton unloading apparatus.

The present system of unloading cotton at gins is by suction supplied by a fan and pulling the cotton through pipes. This plan or machine ordinarily has the suction pipes stationarily fastened and only horizontal movements are permitted through the use of universal joints in the suction pipes. This makes it impossible for an operator to cover the area of many of the vehicles which are used to haul seed cotton to the gins, without the inconvenience of having the wagon or truck moved during the unloading period, which is a waste of time, labor and money.

The primary object of the invention is the provision of an apparatus of this character, wherein by the means of a carriage mounted on a truck the conveyor tubing is movable throughout a wide range in a horizontal direction back and forth, thus making it possible to cover or remove the cotton from a greater area of space than is possible with the present type of unloading machinery used in handling seed cotton.

Another object of the invention is the provision of an apparatus of this character wherein the difficulties encountered in the use of the present type of seed cotton unloading machinery will be eliminated and the unloading of the transportation vehicles will be carried forth with dispatch and convenience during the handling of such cotton from the vehicle to a gin or gins.

A further object of the invention is the provision of an apparatus of this character which is comparatively simple in construction, thoroughly reliable and efficient in its operation, susceptible of a wide range of adjustment, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a vertical sectional view through a gin house showing the unloading apparatus constructed in accordance with the invention installed therein, a vehicle for the transportation of the seed cotton being shown by dotted lines and also by full lines is shown one position of the suction pipe and by dotted lines other adjusted positions thereof.

Figure 2 is an enlarged sectional view on the line 2—2 of Figure 1 looking in the direction of the arrows.

Figure 3 is a fragmentary sectional view taken approximately on the line 3—3 of Figure 2 looking in the direction of the arrows.

Similar reference characters indicate corresponding parts throughout the several views in the drawings.

Referring to the drawings in detail, A designates generally a portion of a gin house or shed and within the same near the roof thereof is supported a horizontally disposed suction pipe B, this being a part of the feed conveyor of the type ordinarily employed in the present day cotton unloading machinery. Removably connected with this pipe B is an elbow 10, the end 11 thereof being telescoped within the pipe B and is held therein by a packing gland 12 so that the said elbow can be swung arcuately with respect to the stationary pipe B and also that a fluid-tight joint will be had between said pipe B and the elbow 10.

Arranged horizontally within the house or shed A are spaced parallel tracks 13 upon which is movable a carriage 14, its body 15 having an elongated opening 16 centrally located therein and through which extends a pipe length 17, the latter being slidably telescoped within the other end 18 of the elbow 10, the pipe length 17 being formed with laterally extending opposed pivot studs 19, these being journaled in bearings 20 mounted midway upon the carriage body 15 so that the said pipe length 17 will be swingingly supported upon the carriage. The carriage 14 is supported upon traction wheels 21 which are movable upon the track rails 13 in a back and forth direction, the wheels 21 being sustained in traction with the rails 13 through the medium of overhanging retaining guides 22, these being superposed with respect to the rails 13 and made fast to the house or shed framing as will be apparent in Figures 1 and 2 of the drawings. Thus in this manner the carriage 14 will be prevented from riding off of the rails 13 during back and forth movements thereof.

The pipe extension 17 has formed thereon at its lower end the male part 23 of a ball-like universal coupling, the female member 24 of which has a pipe-like throat 25 on which is slidably fitted a correspondingly shaped inlet spout or mouth piece 26. The spout or mouth piece 26 at diametrically opposite sides has thereon eyes 27 to which are connected weighted cables 28, these being trained over guide pulleys 29 on the coupling, that is to say, the female part 24 thereof, the weights 30 being at the free ends of said cables and function to normally hold the spout or mouth piece 26 lifted or retracted upon the throat 25 as will be apparent in Figure 2 of the drawings.

In the use of the apparatus the wagon C is run into the house or shed A as shown in Figure 1 of the drawings whereupon an operator manually shifts the apparatus to place the mouth piece or spout 26 at the desired locality with respect to the body of the wagon C and as the cotton is unloaded therefrom the spout or mouth piece 26 can be shifted to enable the removal of the load of the wagon with uniformity throughout the capacity of its body.

It is of course understood that air suction is created within the pipe B and the cotton as constituting the load in the wagon C will be drawn into the mouth piece 26 and sucked upwardly into the pipe B and conveyed to the point of deposit therethrough.

It will be obvious that the apparatus can be readily and conveniently adjusted and manually manipulated for unloading of cotton from a wagon without necessitating the change of position of the wagon from time to time during the unloading operation.

What is claimed is:

1. The combination of an elevated track, a carriage movable upon the track, a pipe length pivotally supported by the carriage, a suction pipe above the track, an elbow swingingly connected with the suction pipe and having the pipe extension telescoped therein, and an extensible mouth piece having universal joint connection with the pipe extension below the track.

2. The combination of an elevated track, a carriage movable upon the track, a pipe length pivotally supported by the carriage, a suction pipe above the track, an elbow swingingly connected with the suction pipe and having the pipe extension telescoped therein, an extensible mouth piece having universal joint connection with the pipe extension below the track, and means active upon the mouth piece to normally hold the same retracted.

3. The combination of an elevated track, a carriage movable upon the track, a pipe length pivotally supported by the carriage, a suction pipe above the track, an elbow swingingly connected with the suction pipe and having the pipe extension telescoped therein, an extensible mouth piece having universal joint connection with the pipe extension below the track, means active upon the mouth piece to normally hold the same retracted, and means for sustaining the carriage upon the track throughout the extent thereof.

4. The combination of an elevated track, a carriage movable upon the track, a pipe length pivotally supported by the carriage, a suction pipe above the track, an elbow swingingly connected with the suction pipe and having the pipe extension telescoped therein, an extensible mouth piece having universal joint connection with the pipe extension below the track, means active upon the mouth piece to normally hold the same retracted, means for sustaining the carriage upon the track throughout the extent thereof, and weighted cables constituting the retracting means for the mouth piece and supported at the universal joint connection with the pipe extension.

5. The combination of an elevated track, a carriage movable upon the track, a pipe length pivotally supported by the carriage, a suction pipe above the track, an elbow swingingly connected with the suction pipe and having the pipe extension telescoped therein, an extensible mouth piece having universal joint connection with the pipe extension below the track, means active upon the mouth piece to normally hold the same retracted, means for sustaining the carriage upon the track throughout the extent thereof, weighted cables constituting the retracting means for the mouth piece and supported at the universal joint connection with the pipe extension, and a packing gland coupling the elbow with the suction pipe.

In testimony whereof I affix my signature.

JESS L. RENNELS.